United States Patent

Skabrond et al.

[11] Patent Number: 6,068,295
[45] Date of Patent: May 30, 2000

[54] MOTOR VEHICLE WITH A POSITION-ADJUSTABLE STEERING WHEEL AND A POSITION-ADJUSTABLE DASHBOARD

[75] Inventors: Klaus Skabrond; Gunther Bartholomai, both of Villingen-Schwenningen, Germany

[73] Assignee: Mannesmann VDO AG, Frankfurt, Germany

[21] Appl. No.: 09/051,563

[22] PCT Filed: Oct. 8, 1996

[86] PCT No.: PCT/EP96/04357

§ 371 Date: Apr. 13, 1998

§ 102(e) Date: Apr. 13, 1998

[87] PCT Pub. No.: WO97/13652

PCT Pub. Date: Apr. 17, 1997

[30] Foreign Application Priority Data

Oct. 12, 1995 [DE] Germany ............................ 195 37 931

[51] Int. Cl.[7] ....................................................... B62D 1/99
[52] U.S. Cl. .......................... 280/775; 280/779; 180/334; 180/90; 296/73
[58] Field of Search .................................... 280/775, 779; 180/334, 90; 74/493; 296/73

[56] References Cited

U.S. PATENT DOCUMENTS

| | | | |
|---|---|---|---|
| 3,032,134 | 5/1962 | Banker | 280/775 |
| 4,449,419 | 5/1984 | Soler Brugera | 280/775 |
| 4,472,982 | 9/1984 | Nishikawa | 74/493 |
| 4,527,444 | 7/1985 | McKee et al. | 280/775 |
| 4,541,298 | 9/1985 | Stritt | 280/775 |
| 4,580,647 | 4/1986 | Peifer et al. | 280/775 |
| 4,656,888 | 4/1987 | Schmitz | 280/775 |
| 5,088,342 | 2/1992 | Bening et al. | 280/775 |

*Primary Examiner*—J. J. Swann
*Assistant Examiner*—James S. McClellan
*Attorney, Agent, or Firm*—Brown & Wood, LLP

[57] ABSTRACT

To facilitate the joint raising and lowering and pivoting of the steering wheel (2) or the steering column (1) and the dashboard (4) of a motor vehicle, it is suggested to form an assembly consisting of the steering column (1) and the dashboard (4), which can be secured in a motor vehicle as a pre-manufactured unit by using a suitable bracket (7). The dashboard (4) is associated with a stabilizing device (18) including slideway guide arrangements (40/41 and 37) combined with a toothed wheel/rack connection (35/36 and 33/34) provided on each of widely spaced guide rails (19/20).

5 Claims, 5 Drawing Sheets

MOTOR VEHICLE WITH A POSITION-ADJUSTABLE STEERING WHEEL AND A POSITION-ADJUSTABLE DASHBOARD

BACKGROUND OF THE INVENTION

1. Field of the Invention

The invention relates to a motor vehicle with a position adjustable steering wheel and a position adjustable dashboard.

2. Description of the Prior Art

Studies directed to development of a new concept of working places of bus drivers, in particular, of city bus drivers show, see, e.g., an offprint from ATZ (1994), Heft 7/8, that from the medical and ergonomical point of view, the shape and the adjustment possibilities of a driver's seat alone is not sufficient to achieve an optimal posture of a motor vehicle driver. Rather, in order for a plurality of drivers to be in a position in which they can take a healthy and comfortable working posture, it is additionally necessary to provide possibilities for axial adjustment and for pivoting of the steering wheel and, in addition, to provide prerequisites for changing a position of the dashboard. At that, there exists a direct correlation between the angle of the steering wheel to a horizontal and the angle of the display plane of the dashboard to a horizontal. In other words, considering the position of the driver's eyes, for a relatively big driver, the steering wheel would occupy an elevated, only slightly inclined, position, and the instrumentation panel of the dashboard would be in a flat, slightly inclined position. Whereas for a relatively small driver, the steering wheel would occupy a lowered, more inclined position, and likewise the instrumentation panel of the dashboard would occupy a more upright position.

The realization of medical and ergonomical recommendations present significant technical problems, in particular with regard to the locking and adjustment of a relatively large, widely-spread mass of the dashboard and to its stabilization, i.e., with regard to its oscillation-free suspension. It is to be noted that with regard to the adjustment, the necessary forces should be relatively small particularly in buses, which often have a change of drivers with the possibility that the driver may be female. Additional difficulties consist in that the required ergonomical-technical optimization should be conducted in a technical area in which smallest possible costs and a series production capability, that is, good reproductability as well as inexpensive assembly, are required.

Accordingly, an object of the present invention is to so arrange a steering wheel and a dashboard in a motor vehicle so that the position of the steering wheel and the dashboard can easily be changed, that the self-oscillation with respect to the driver's cab is prevented, and that the costs of assembly of such arrangement in a motor vehicle are reduced to the most possible extent.

SUMMARY OF THE INVENTION

This and other objects of the present invention, which will become apparent hereinafter, are achieved by providing a motor vehicle with a position-adjustable steering wheel and a position-adjustable dashboard, in which the dashboard and an axially adjustable and pivotally supported steering column, which carries a steering wheel, are fixedly connected with each other, and in which there is provided a bracket, which is connectable with a front side cross-spar of the driver's cab, on which a supporting frame, which carries the steering column and is provided with slideway guides for the steering column, is secured. A stabilizing device, which is associated with the dashboard, is connected with the supporting frame. The stabilizing device has two, spaced from each other by a relatively large distance, guide rails and functional element which are connected with the dashboard and which are associated operatively with the guide rails in such a way that the stabilizing device provides for both height adjustment and pivotal movement of the steering column/dashboard about a rotational axle displaceable in the supporting frame.

The solution of the problem set above is described by claim 1. Advantageous details of the embodiment of the invention follow from subclaims.

It is to be noted that according to the found solution, the steering column and the dashboard do not move relatively to each other, but rather form a raising and lowering as well as pivotable assembly which is displaceable by using suitable parallel slideway guides, and is locked in each position. The steering wheel serves as a handle for an ergonomically-appropriate accommodation of this assembly to a particular male or female driver. A particular advantage can be seen in that the assembly is arranged with a three-point support using a bracket which is easily secured on the front side cross-spar of the driver's cab of a respective motor vehicle, so that as a result, the assembly simply follows the driver's cab oscillations. At that, the assembly can be produced as a functional unit outside of the motor vehicle and be inserted into the motor vehicle as pre-manufactured unit.

Of a particular importance for the found solution is the stabilizing device which insures a relatively wide support of the dashboard by suitably mounted guide rails and prevents jamming of the assembly formed of the steering wheel and the dashboard during its position-adjustment. The means for preventing jamming associated with each of the rails for the dashboard, a combination consisting of a gear wheel/toothed rack arrangement and a slideway guide and which provides for a uniform distribution of forces generated during raising or lowering and during pivotal movement of the steering wheel/dashboard assembly. To this end, a hinge connection is provided between the dashboard and a connection rod which carriers both gear wheels.

The found solution further consists in that for effecting a pivotal movement of the assembly, a smallest possible play is contemplated in gear wheel/toothed rack engagement and between slideways provided in the guide rails and the connection rod engageable in both slideways. The spacial arrangement of the functional elements secured to the dashboard of the stabilizing device with respect to the rotational axis of the steering wheel is so effected that the plane, in which the connection rod and rotational axis are arranged, extends, in the middle position of the pivotal angle, substantially perpendicular to the plane in which both slideways of the stabilizing device are located.

In addition, relatively simple, with regard to manufacturing and particularly with regard to mounting, means is provided for locking the stabilizing device. First to be mentioned is a spring-biased, pneumatically releasable clamp element loosely supported on the connection rod. The force for effecting this force-locking fixation is transmitted from the clamp element via tightening sleeves, which are supported on the connection rod and are provided with play-compensating means, in the direction toward the guide rails and thereby in the direction of the outwardly located gear wheels of the stabilizing device. The latter are connected with the connection rod by threaded sleeves and are counteracted in an appropriate manner. That is, the force flow is closed by a tensioned connection rod.

For completeness, it should be mentioned that despite a considerable weight of the steering column/dashboard assembly, the dimensioning can be so effected that raising requires little force and, if necessary, can be effected automatically. To this end, the slideway guides, which are inclined in a direction opposite to the working direction of the gravity force, cooperates with a telescopic shaft, which forms part of a cadran shaft extending from the steering column and which is provided with gas spring.

BRIEF DESCRIPTION OF THE DRAWINGS

Below, the invention will be explained in detail on the basis of an embodiment example shown in the drawings. The drawings show.

DETAILED DESCRIPTION OF THE PREFERRED EMBODIMENTS

Figure 1:
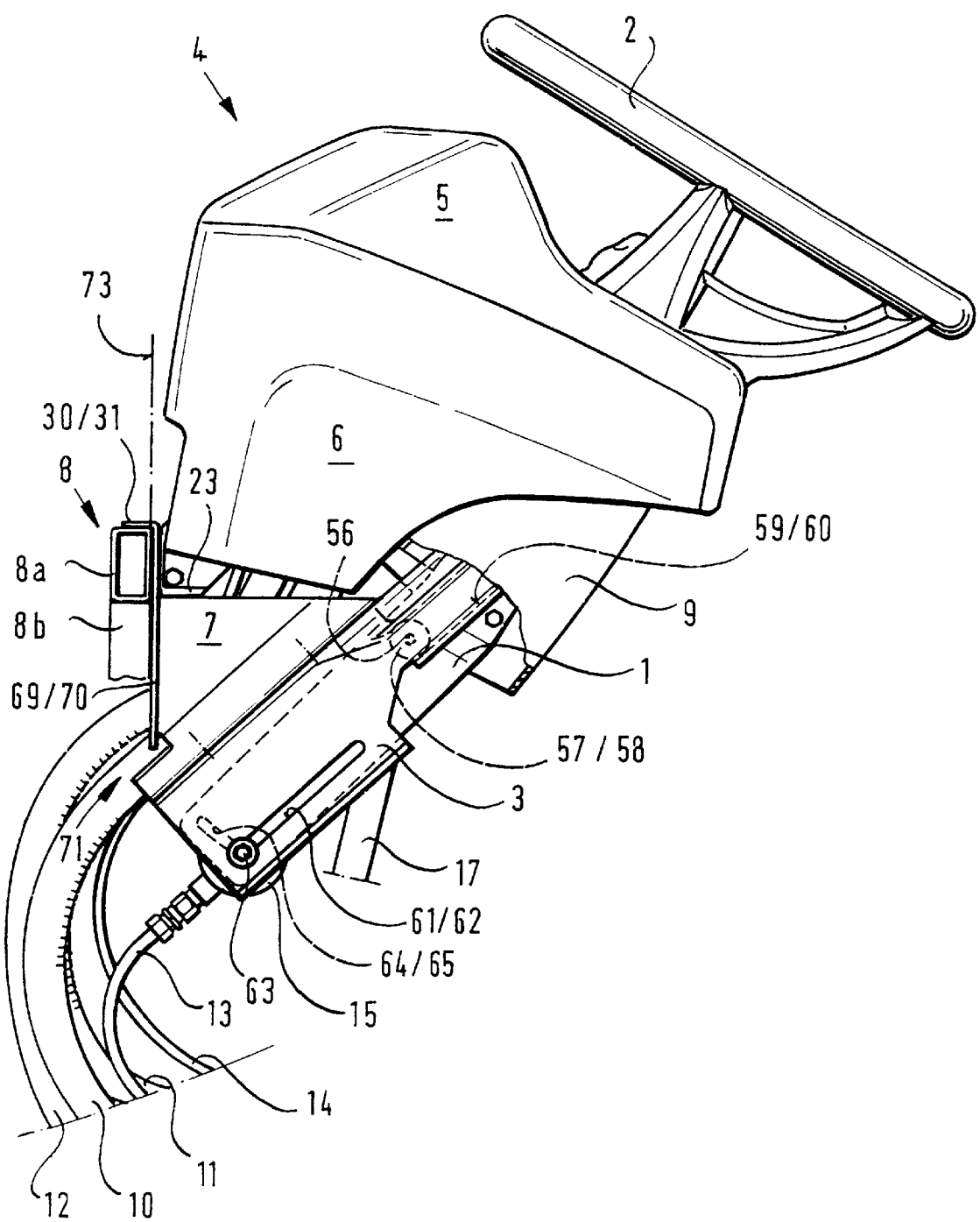
FIG. 1 a side view of a steering column/dashboard assembly according to the present invention.

As shown in the general view of FIG. 1, a steering column 1 in which a shaft (not shown) of a steering wheel 2 is arranged, or a supporting frame 3 associated with steering column 1, and a dashboard 4 in the body of which, formed of two shells 5, 6, display and recording instruments, switches and other control elements are located, and are associated with a bracket 7 which is supported on a front side frame 8 of a driver's cab of a corresponding motor vehicle and which is secured to the frame 8 in an appropriate manner not shown in detail.

The frame 8 in this case is formed of a cross-spar 8a of the driver's cab and of preferably two posts or upright supports 8b welded to the cross-spar 8a and extending to the driver's cab floor. The jacket of the steering column 1 is designated with a reference numeral 9, reference numerals 10 and 11 designate ventilation hoses leading toward the dashboard 4, and reference numeral 12 designates a protective hose for electrical connections of the dashboard 4. Two conduits 13 and 14 represent pressure air conduits. They are connected, respectively, with clamp elements 15 and 16 (FIG. 2), which serve for locking of the steering column/dashboard assembly. Reference numeral 17 designates an element of a cadran shaft extending toward the steering gear and connected with the shaft of the steering wheel. Preferably, this cadran shaft element is formed as a telescopic shaft provided with a pneumatic spring.

Figure 2:
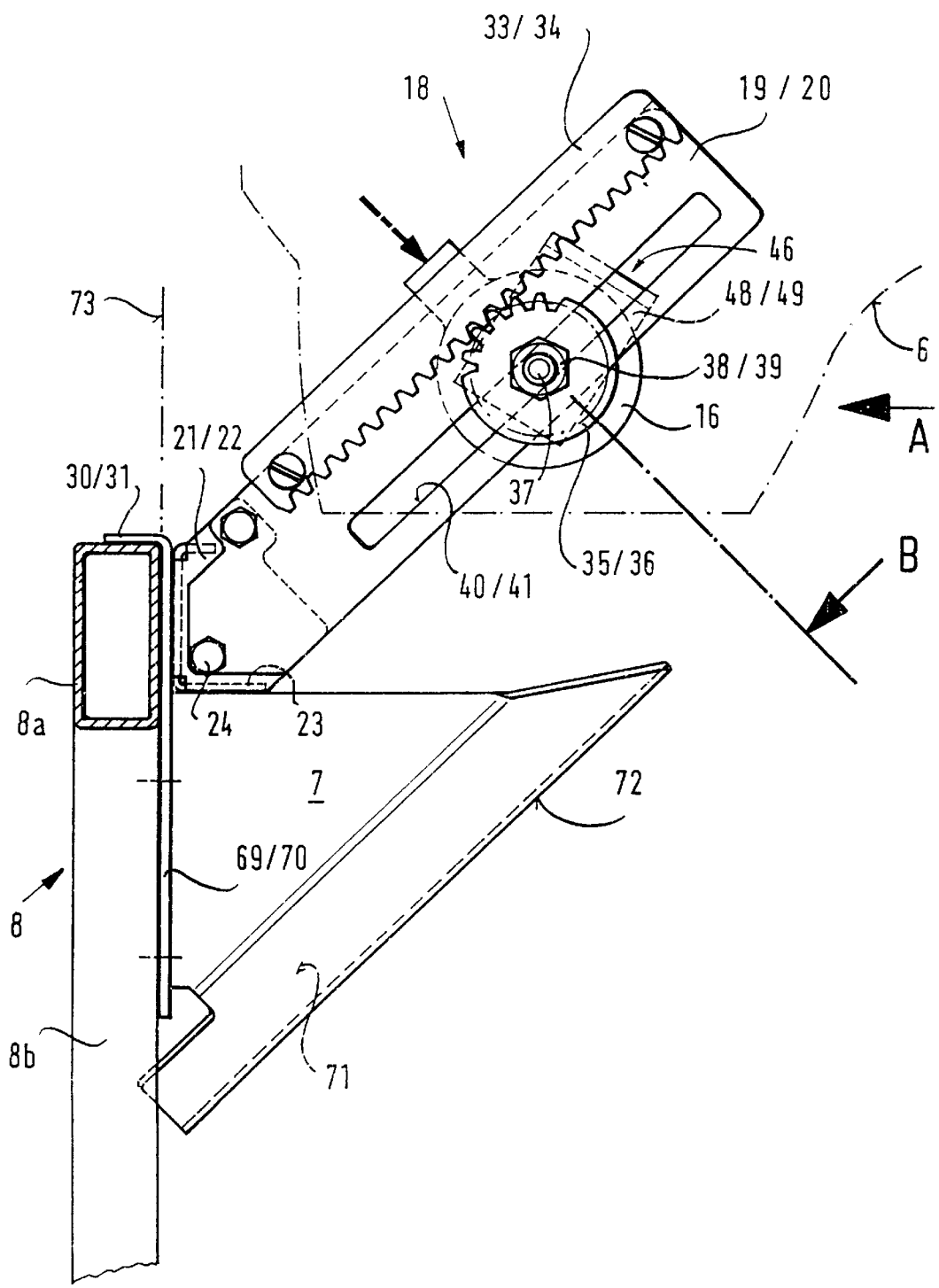
FIG. 2 a side view of a bracket and a stabilizing device relative to a stationary frame, with respect to a motor vehicle.
Figure 3:
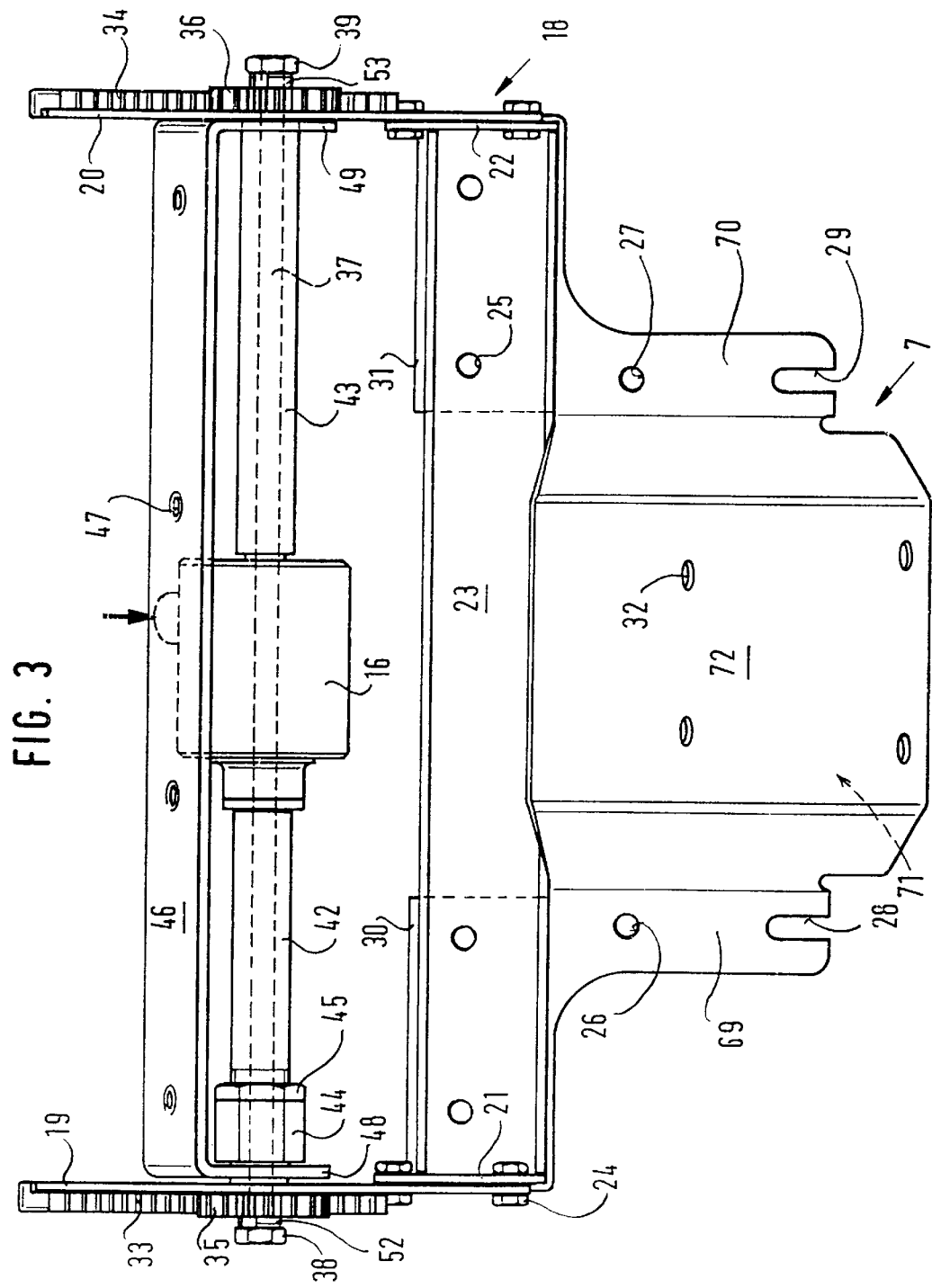
FIG. 3 a view of the bracket and the stabilizing device in the direction of arrow "A" in FIG. 2, without the stationary frame.

FIGS. 2 and 3 show a stabilizing device 18 associated with the dashboard 4. The stabilizing device has guide rails 19 and 20 which are attached to cheeks 21 and 22 of a cross-bar 23 supported on the bracket 7. Appropriate connection screws are designated with a reference numeral 24. The cross-bar 23, which is formed as a U-shaped part, represents an additional reinforcement for the bracket 7. Through-bores 25, 26, 27 and slots 28 and 29 are provided for securing the bracket 7 to the frame 8. Ledges 30 and 31 are provided on the bracket 7 for releasing of the screw connection and also for facilitating the assembly, namely, the suspension of the steering column/dashboard assembly on the cross-spar 8a before screwing. Reference numeral 32 designates one of the four through-bores provided in the bracket 7 for screwing the bracket 7 with the supporting frame 3 of the steering column 1.

Figure 4:
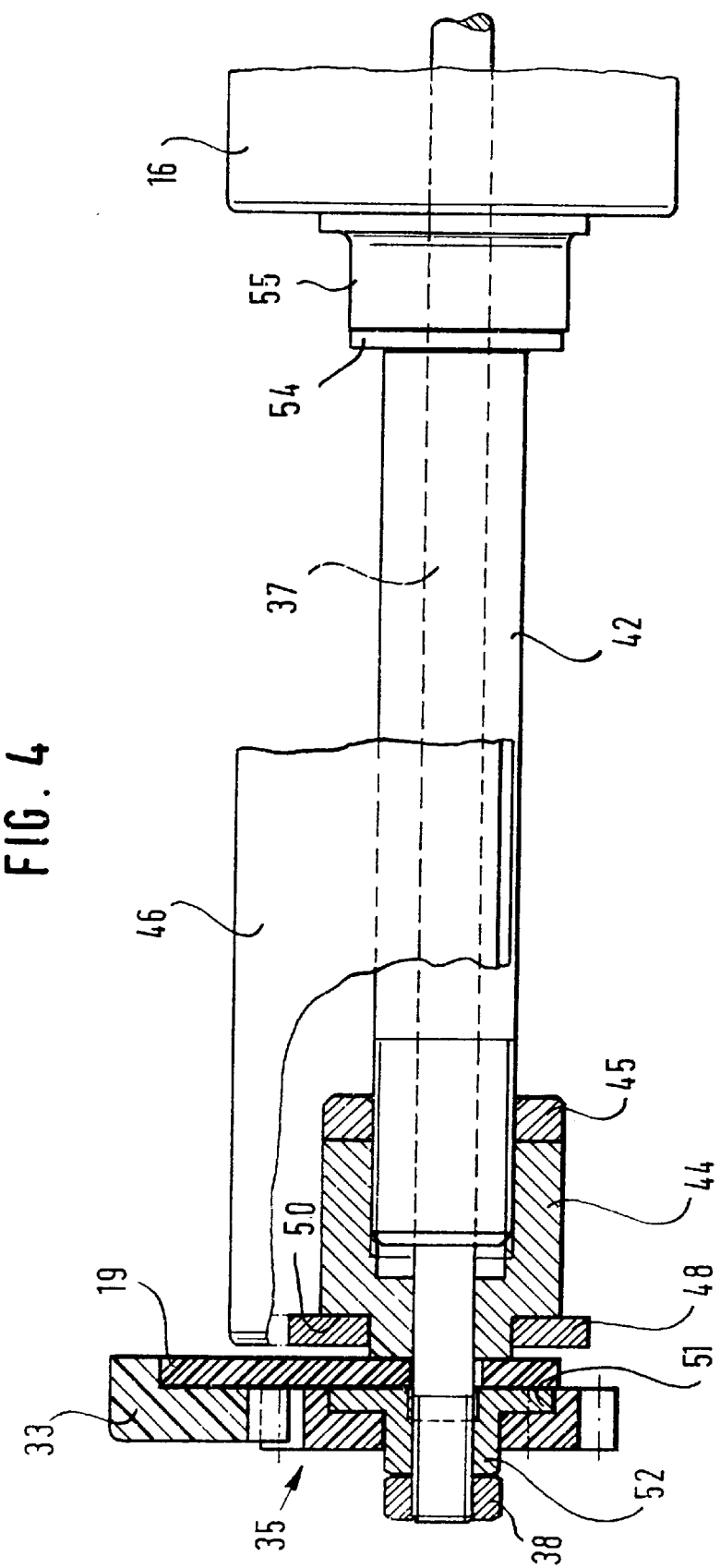
FIG. 4 a partially cross-sectional view of the stabilizing device along line B in FIG. 2.

As further can be seen from FIGS. 2 and 3, two toothed racks 33 and 34 are secured on the guide rails 19 and 20 with screws, which is not shown in detail, in such a manner that respective toothings are provided on the outer sides of the guide rails 19 and 20. Two gear wheels 35 and 36, which are secured on a connection rod 37 with nuts 38 and 39, respectively, engage the racks 33 and 34. That is, the connection rod 37 extends through both guide rails 19, 20 and thus, through slideways 40 and 41 formed in the guide rails 19 and 20. As shown particularly in FIG. 3, two tightening sleeves 42 and 43 are associated with the clamp element 16 loosely supported on the connection rod 37. The tightening sleeves 42 and 43 are likewise loosely supported on the connection rod 37. One of the tightening sleeves, sleeve 42, is provided with a thread, without a reference numeral, for receiving counteracting nuts 44 and 45, which are designated for backlash compensation. Reference numeral 46 designates a support which is formed as a bearing bracket and which is fixedly connected with the shell 6 of the dashboard 4. One of the through-bores for screwing them together is designated with a reference numeral 47. As it is particularly shown in FIG. 3, the legs 48 and 49 of the support 46 are rotatably supported on the tightening sleeves 42 and 43, i.e., the dashboard 4 is pivotally connected with the connection rod 37 and the functional elements arranged thereon. FIG. 4 shows that one leg, leg 48, of the support 46, is not supported directly on the sleeve 42 but rather on a shoulder 50 formed on the nut 44. As further shown in FIG. 4, the gear wheel 35 is provided with a threaded bushing 51 the neck 52 of which has surfaces, not shown in detail, engageable by a tool. The same is true for the gear wheel 36. The neck of a threaded bushing associated with gear wheel 36 can be seen in FIG. 3 and it is designated with a reference numeral 53. A washer designated with a reference numeral 54 serves for compensating the difference in diameters between the sleeve 42 and a pressure member 55 of the clamp element 16.

Figure 5:
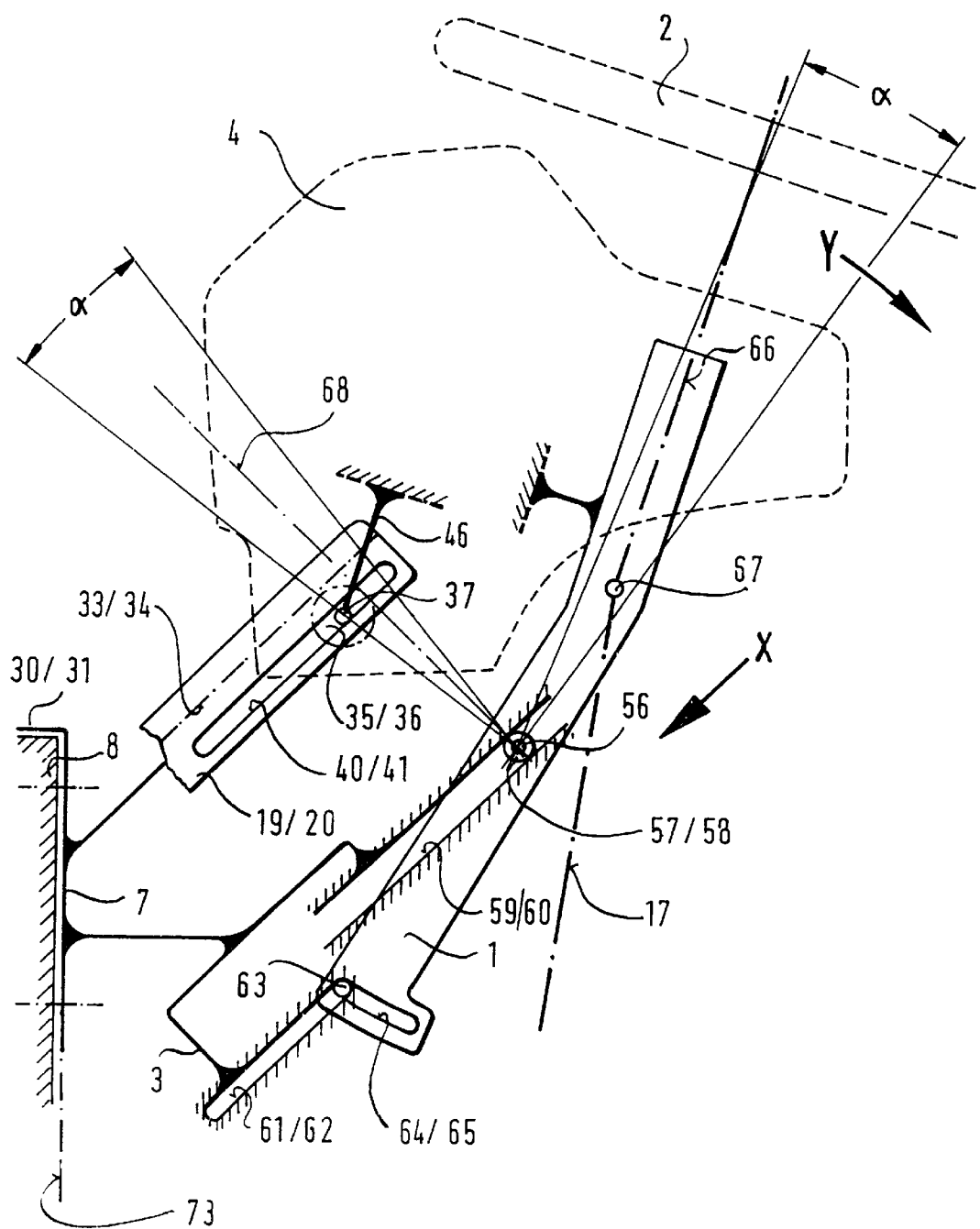
FIG. 5 a schematic view showing displacement of the steering column/dashboard with respect to the driver's cab.

From the schematic view of FIG. 5, it can be seen that the steering column/dashboard assembly is displaceable in a plurality of parallel slideway guides and that it can be lifted or sunk in a direction of arrow X, and that it can further pivot in a direction of arrow Y in each position in the direction of arrow X by an angle α. It can further be seen that, on one hand, the dashboard 4 is fixedly connected with the steering column 1 and, on the other hand, is drivingly connected with the guide rails 19 and 20 of the stabilizing device 18, which are fixedly secured to the bracket 7 by functional elements 35 and 36, 37, 38 and 39, and 46.

The pivoting of the assembly is effected about a stationary with respect to the steering column, rotational axle 56 which supports two ball bearings arranged, for example, on opposite sides of a steering column 1, which is formed as a U-shaped body, and serving as running rollers 57 and 58. The running rollers 57 and 58 engage in the groove 59, 60 formed in the supporting frame 3 and functioning as slideways. The second guide for the steering column 1 is likewise formed in the supporting frame 3 as slots 61 and 62 also functioning as slideways limiting the stroke of the steering column 1. To this end, the steering column 1 is associated with an axle 63 which is engageable in both slots 61 and 62. The axle 63 serves as a stop limiting the pivotal movement of the steering column 1, with the axle 63 extending through elongate openings 64 and 65 formed in the side walls of the steering column 1. As can be seen in FIG. 1, the clamp element 15 is supported on the axle 63. The clamp element 15 serves for providing a force-locking connection between the supporting frame 3 and the steering column 1 and thus, for locking the steering column 1 in a lift/pivotal position.

In FIG. 5, the reference numeral 66 designates a shaft which is fixedly connected with the steering wheel 2 and is rotatably supported in the steering column 1. The reference numeral 67 designates a universal joint provided between the shaft 66 and the telescopic shaft 17, which supports the steering column/dashboard assembly when the clamp elements 15, 16 are released. From FIG. 5, it is further clear that the radial stroke of the connection rod 37 and thus, of the gear wheels 35 and 36, would be minimal upon pivotal movement of the assembly when the functional elements, which are associated with the dashboard 4 are so arranged that in the middle position 68 of the angle α, the plane in which both the connection rod 37 and the rotational axle 56 are located extends to the plane in which the slideways 40 and 41 are located, at a right angle.

It should be further mentioned that the bracket 7 is so formed between the cross-bar 23 and support arms 69, 70 associated therewith, that it forms, as can be seen in FIGS. 2 and 3, a guide channel 71, preferably between the supports 8b of the frame 8, for the ventilation hoses 10 and 11, protective hose 12 for the electrical conductors and the pressure air conduit 14. The base 72 of the bracket 7 forms flange surfaces for the supporting frame 3 of the steering column 1. Because shearing of the conductors and hoses over the edges of the guide channel 71 during adjustment of the steering column/dashboard should be prevented, it is advisable to provide a plastic coating, together with appropriate rounding of the edges, at least a plastic sole plate secured to the bottom of the guide channel 71. Reference numeral 73 designates the attachment plane of the bracket 7.

What is claimed is:

1. A motor vehicle with a position-adjustable steering wheel and a position-adjustable dashboard, characterized in that the dashboard (4) and an axially adjustable and pivotally supported steering column (1), which carries a steering wheel (2), are fixedly connected with each other, and that there is provided a bracket (7), which is connectable with a front side cross-spar (8a) of the driver's cab, on which a supporting frame (3), which carries the steering column (1) and is provided with slideway guides (59/60, 61/62) for the steering column (1), is secured, and with which a stabilizing device (18) associated with the dashboard (4) is connected, the stabilizing device (18) having two, spaced from each other guide rails (19, 20) and functional elements (35/36, 37, 38/39, 46) which are connected with the dashboard (4) and which are associated operatively with the guide rails (19, 20) in such a way that the stabilizing device (18) provides for both height adjustment and pivotal movement of the steering column/dashboard about a rotational axle (56) displaceable in the supporting frame (3);

wherein the bracket (7) comprises a cross-bar (23) which lies in an attachment plane (73) and two support arms (69, 70) associated therewith and extending at right angles thereto, wherein the cross-bar (23) has cheeks (21/22) formed thereon for attachment of the guide rails (19/20), wherein at least one ledge (30/31) is provided on the bracket (7) on a side thereof remote from the cheeks (21, 22) for suspending the bracket on the cross-spar (8a) of the motor vehicle, and in that a guide channel (71), which is provided between the support arms (69/70) is so formed that the bottom (72) of the guide channel (71) extends to the attachment plane (73) at an acute angle.

2. A motor vehicle according to claim 1, characterized in that the stabilizing device (18) comprises a connection rod (37) extending through the slideways (40/41) in the guide rails (19, 20), in that gears wheels (35/36) are secured on the connection rod (37) outside of the guide rails (19/20), in that toothed rack (33/34) are connected with the guide rails (19/20) and are engaged by the gear wheels (35/36), and in that the connection rod (37) is so connected with the dashboard (4) that in middle position (68) of a pivot angle of the steering column/dashboard assembly, the plane, in which both the connection rod (37) and the rotational axle (56) are located, extends perpendicular to a plane in which slideways (40/41) are located.

3. A motor vehicle according to claim 1, characterized in that between the guide rails (19/20), a clamp element (16) which is loosely supported on the connection rod (37), is provided, in that tightening sleeves (42/43), concentric with the connection rod (37), are associated with the clamp element (16), and in that a support (46), which is formed as a bearing support and is mounted on the tightening sleeves (42/43), connects the dashboard (4) and the functional elements (35/36, 37, 38/39, 46) of the stabilizing device (18) which are associated with the dashboard (4).

4. A steering column/dashboard assembly for a motor vehicle, comprising:

a steering column for supporting a steering wheel;

a dashboard fixedly connected to the steering column for joint pivotal and axial movements therewith;

a stationary frame for supporting the steering column and provided with slideway guides for enabling pivotal and axial movements of the steering column, together with the dashboard;

a bracket for supporting the stationary frame and securable to front cross-spar of a driver's cab of the motor vehicle;

a stabilizing device connected with the supporting bracket for supporting the dashboard and for preventing jamming of the steering wheel/dashboard assembly during position-adjustment of the assembly, the stabilizing device including spaced guide rails providing for support of the stabilizing device on the bracket, and means connecting the stabilizing device with the dashboard and enabling axial and pivotal movement of the steering wheel/dashboard assembly about a rotational axle displaceable in the supporting frame; and a shaft fixedly connected with the steering wheel and rotatably supported in the steering column, and a universal joint for connecting the shaft with a telescopic shaft which connects the steering wheel with a steering gear.

5. A motor vehicle according to claim 4, characterized in that an element of a steering shaft, which is provided between the steering wheel (2) and a steering gear of the motor vehicle, is formed as a sprung telescopic shaft (17).

* * * * *